(12) United States Patent
Yano et al.

(10) Patent No.: US 9,520,759 B2
(45) Date of Patent: Dec. 13, 2016

(54) MOTOR DRIVEN COMPRESSOR

(71) Applicant: KABUSHIKI KAISHA TOYOTA JIDOSHOKKI, Kariya-shi, Aichi-ken (JP)

(72) Inventors: Junya Yano, Kariya (JP); Yusuke Kinoshita, Kariya (JP); Satoru Egawa, Kariya (JP); Kazuhiro Kuroki, Kariya (JP); Ken Suitou, Kariya (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 524 days.

(21) Appl. No.: 14/070,037

(22) Filed: Nov. 1, 2013

(65) Prior Publication Data

US 2014/0134017 A1 May 15, 2014

(30) Foreign Application Priority Data

Nov. 15, 2012 (JP) ................................. 2012-251141

(51) Int. Cl.
*H02K 11/02* (2016.01)
*F04C 29/00* (2006.01)
(Continued)

(52) U.S. Cl.
CPC ............. *H02K 11/022* (2013.01); *F04B 35/04* (2013.01); *F04B 39/121* (2013.01); *F04C 29/00* (2013.01); *H02K 11/02* (2013.01); *H02K 5/24* (2013.01)

(58) Field of Classification Search
CPC .......... H02K 5/24; H02K 11/01; H02K 11/02; H02K 11/022; F02B 35/04; F04C 29/00
(Continued)

(56) References Cited

U.S. PATENT DOCUMENTS 4,499,391 A * 2/1985 Sakamoto ................ H02K 5/04
310/256
4,941,769 A * 7/1990 Natsume ............... F16B 5/0241
403/377
(Continued)

FOREIGN PATENT DOCUMENTS

CN 102207070 A 10/2011
EP 1450044 A2 8/2004
(Continued)

OTHER PUBLICATIONS

Communication dated Dec. 22, 2015, issued by the Japan Patent Office in corresponding Japanese Application No. 2012-251141.
(Continued)

*Primary Examiner* — John K Kim
(74) *Attorney, Agent, or Firm* — Sughrue Mion, PLLC

(57) ABSTRACT

A motor-driven compressor that includes a metal housing accommodating a compression unit and an electric motor, a cover coupled to the housing, wherein the cover includes a resin portion and a metal shield, and the shield blocks electromagnetic noise, and a bolt that couples the cover to the housing. The housing and the cover define an accommodating chamber that accommodates a motor driving circuit that drives the electric motor. The cover includes an insertion hole into which the bolt is insertable. The shield includes a seat that surrounds the insertion hole and is held between the bolt and the housing. The cover is configured to allow for an axial force of the bolt to be applied to the seat and not to the resin portion.

11 Claims, 3 Drawing Sheets

(51) Int. Cl.
*F04B 35/04* (2006.01)
*F04B 39/12* (2006.01)
*H02K 5/24* (2006.01)

(58) Field of Classification Search
USPC .. 310/51, 68 R, 85, 89, 256, 400; 417/410.1
IPC ................................ H02K 11/02; F04C 29/00
See application file for complete search history.

(56) References Cited

U.S. PATENT DOCUMENTS

| | | | |
|---|---|---|---|
| 6,321,536 B1* | 11/2001 | Henderson | F02B 37/22 60/605.2 |
| 6,617,719 B2* | 9/2003 | Sunaga | H02K 3/50 310/64 |
| 6,619,933 B2* | 9/2003 | Ikeda | F04B 39/06 417/410.1 |
| 7,122,928 B2* | 10/2006 | Shindo | B60R 16/0239 310/51 |
| 2004/0108778 A1* | 6/2004 | Tsukamoto | H02K 11/33 310/83 |
| 2009/0251018 A1* | 10/2009 | Koshida | B60K 6/26 310/89 |
| 2010/0074772 A1 | 3/2010 | Hoshino et al. | |
| 2011/0243767 A1 | 10/2011 | Tozawa et al. | |
| 2012/0237376 A1* | 9/2012 | Kinoshita | F01C 21/10 417/423.7 |
| 2014/0134017 A1* | 5/2014 | Yano | F04C 29/00 417/410.1 |

FOREIGN PATENT DOCUMENTS

| | | |
|---|---|---|
| EP | 2500516 A2 | 9/2012 |
| EP | 2587060 A1 | 5/2013 |
| EP | 2653726 A2 | 10/2013 |
| JP | 2-40106 U | 3/1990 |
| JP | 2-53506 U | 4/1990 |
| JP | 09-137813 A | 5/1997 |
| JP | 2003133756 A | 5/2003 |
| JP | 2005-110328 A | 4/2005 |
| JP | 2008013020 A | 1/2008 |
| JP | 2008-215236 A | 9/2008 |
| WO | 2012086244 A1 | 6/2012 |

OTHER PUBLICATIONS

Communication dated Aug. 25, 2015 from the State Intellectual Property Office of P.R. of China issued in corresponding application No. 201310559908.1.

Extended European Search Report, dated Feb. 25, 2014, issued by the European Patent Office, in counterpart Application No. 13191566.2.

Communication dated Aug. 2, 2016, from the Japanese Patent Office in counterpart application No. 2012-251141.

* cited by examiner

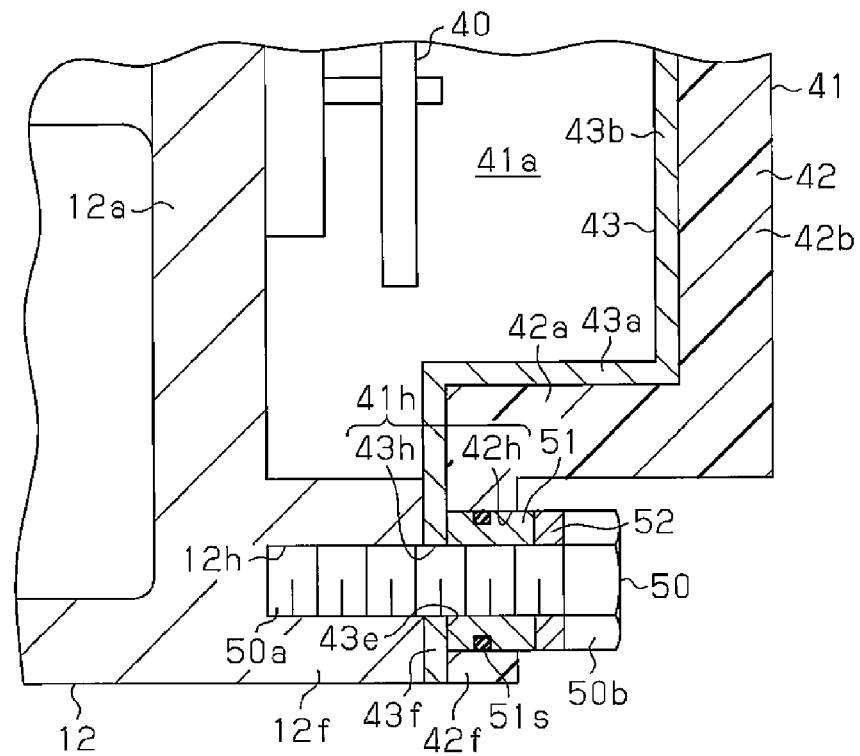
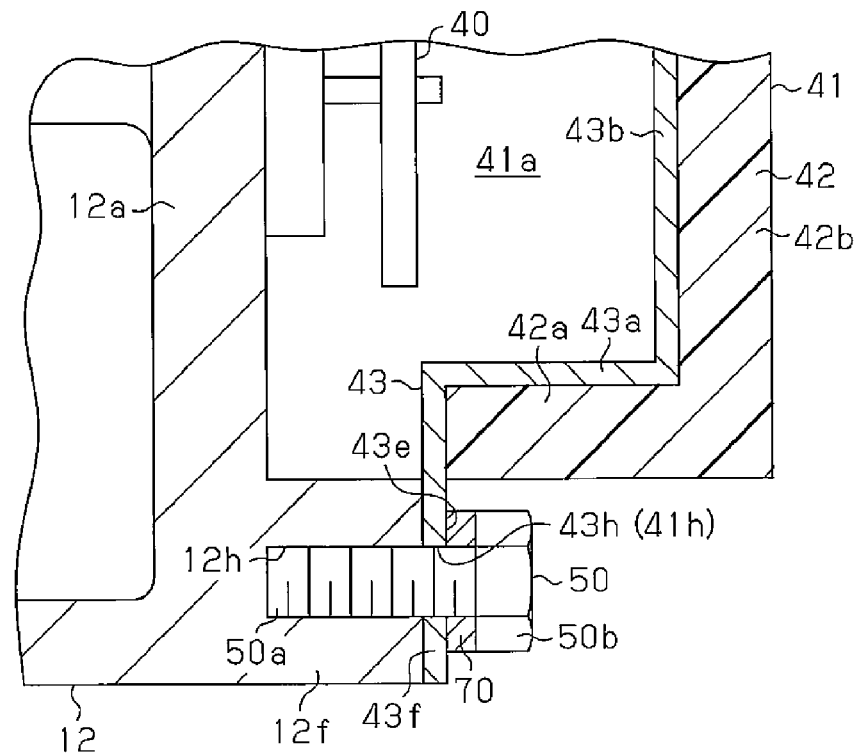

MOTOR DRIVEN COMPRESSOR

BACKGROUND OF THE INVENTION

The present invention relates to a motor-driven compressor.

A motor-driven compressor includes a metal housing accommodating a compression unit, which compresses and discharges refrigerant, and an electric motor, which drives the compression unit. A cover that defines an accommodating chamber is coupled to the housing. The accommodating chamber accommodates a motor driving circuit that drives the electric motor.

When the cover is made of metal, the overall weight of the motor-driven compressor increases. The use of a resin cover allows for the motor-driven compressor to be lighter. However, a resin cover would transmit electromagnetic noise from outside the compressor to the motor driving circuit. In addition, electromagnetic noise from the motor driving circuit may leak out of the compressor through the resin cover.

Accordingly, Japanese Laid-Open Patent Publication No. 2008-215236 discloses a laminated cover including a conductive layer (shield), which is made of a conductive material such as aluminum and iron, and an insulating layer (resin portion), which is made of an insulating material such as resin and rubber. The cover is coupled to a housing by a bolt, with the conductive layer in contact with the housing. Electromagnetic noise from the exterior is blocked by the conductive layer and transmitted to the housing. This suppresses electromagnetic noise entering the accommodating chamber through the insulating layer. In addition, electromagnetic noise from the motor driving circuit is blocked by the conductive layer and transmitted to the housing. This suppresses the leakage of electromagnetic noise from the motor driving circuit to the exterior through the insulating layer.

However, when the cover of the publication is coupled to the housing, the conductive layer and the insulating layer are held between the housing and the bolt. Thus, the axial force of the bolt tends to deform the insulating layer. Deformation of the insulating layer may loosen the bolt and adversely affect the seal between the housing and the cover. This may result in foreign matter or water entering the accommodating chamber through a gap between the housing and the cover.

SUMMARY OF THE INVENTION

It is an object of the present disclosure to provide a motor-driven compressor that avoids degradation of the seal between a housing and a cover that would be caused when a resin portion deforms and loosens a bolt.

To achieve the above object, one aspect of the present invention is a motor-driven compressor that includes a metal housing accommodating a compression unit and an electric motor, a cover coupled to the housing, wherein the cover includes a resin portion and a metal shield, and the shield blocks electromagnetic noise, and a bolt that couples the cover to the housing. The housing and the cover define an accommodating chamber that accommodates a motor driving circuit that drives the electric motor. The cover includes an insertion hole into which the bolt is insertable. The shield includes a seat that surrounds the insertion hole and is held between the bolt and the housing. The cover is configured to allow for an axial force of the bolt to be applied to the seat and not to the resin portion.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 4 is an enlarged cross-sectional view showing a bolt of a further embodiment; and FIG. 5 is an enlarged cross-sectional view showing a bolt of a yet another embodiment.

DETAILED DESCRIPTION OF THE INVENTION

First Embodiment

Figure 1A:
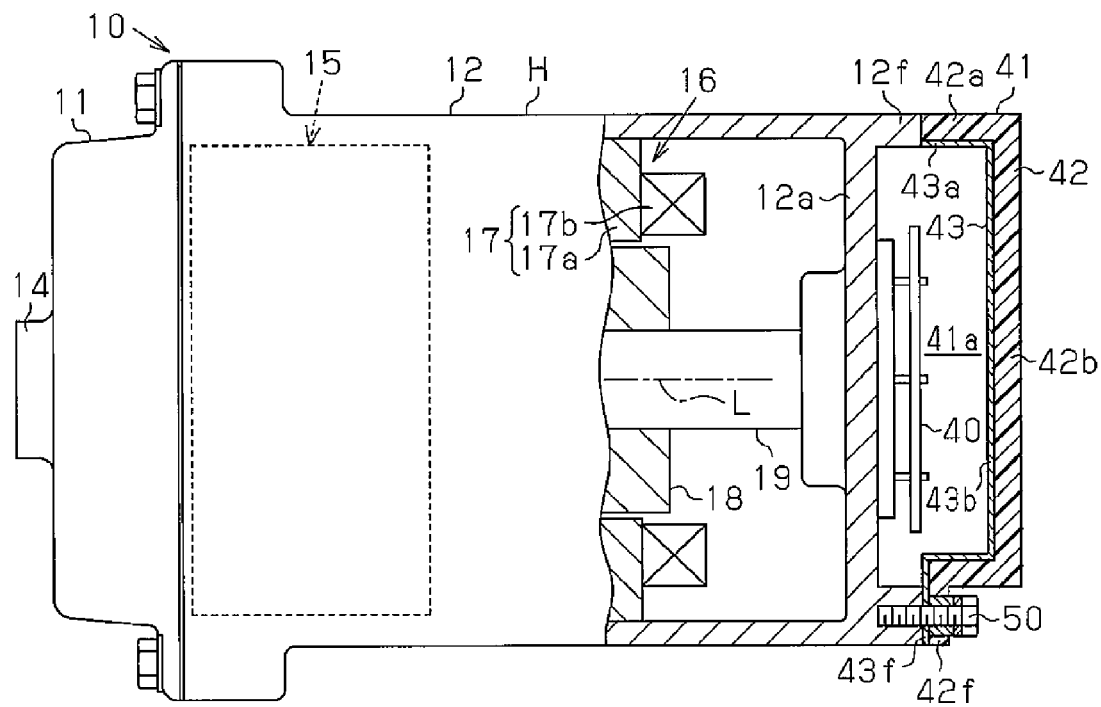
FIG. 1A is a partial cross-sectional view showing a motor-driven compressor of a first embodiment.
Figure 1B:
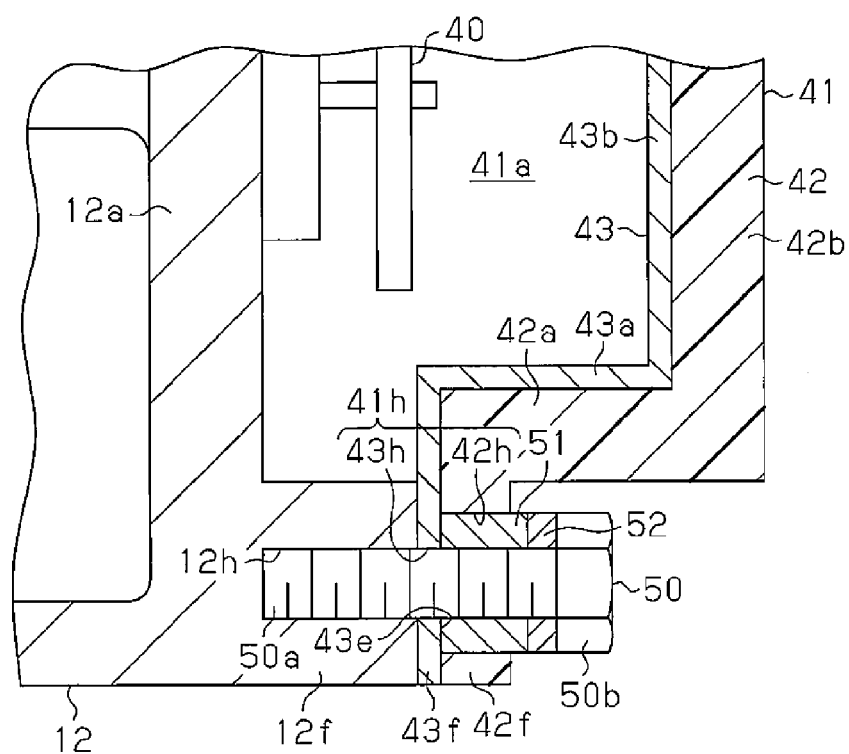
FIG. 1B is an enlarged cross-sectional view showing a bolt in the motor-driven compressor of FIG. 1.

Referring to FIGS. 1A and 1B, a motor-driven compressor of the first embodiment will now be described.

As shown in FIG. 1A, a motor-driven compressor 10 includes a housing H that includes an aluminum (metal) discharge housing member 11 and an aluminum (metal) suction housing member 12 coupled to the discharge housing member 11. The discharge housing member 11 and the suction housing member 12 are cylindrical, and each includes an open end and a closed end. The suction housing member 12 has a peripheral wall including a suction port (not shown). The suction port is connected to an external refrigerant circuit (not shown). The discharge housing member 11 includes a discharge port 14 connected to the external refrigerant circuit. The suction housing member 12 accommodates a compression unit 15 (indicated by the broken lines in FIG. 1), which compresses refrigerant, and an electric motor 16, which drives the compression unit 15. Although not shown in the drawings, the compression unit 15 of the present embodiment includes a fixed scroll, which is fixed in the suction housing member 12, and a movable scroll, which is engaged with the fixed scroll.

A stator 17 is fixed to the inner surface of the suction housing member 12. The stator 17 includes a stator core 17a, which is fixed to the inner surface of the suction housing member 12, and coils 17b, which are wound around teeth (not shown) of the stator core 17a. A rotatable rotation shaft 19 extends through the stator 17 in the suction housing member 12. A rotor 18 is fixed to the rotation shaft 19.

The suction housing member 12 includes an end wall 12a that includes an annular flange 12f. The flange 12f extends from the entire rim of the end wall 12a in the direction of an axis L of the rotation shaft 19. The flange 12f has an open end to which a cover 41 is coupled. The cover 41 is cylindrical and has a closed end. The end wall 12a, the flange 12f, and the cover 41 define an accommodating chamber 41a. The accommodating chamber 41a accommodates a motor driving circuit 40 that drives the electric motor 16. The motor driving circuit 40 is connected to the electric motor 16 by wires (not shown). The motor driving circuit 40 is coupled to the end wall 12a in the accommodating chamber 41a. Thus, in the present embodiment, the compression unit 15, the electric motor 16, and the motor driving circuit 40 are arranged in this order in the axial direction of the rotation shaft 19.

The cover 41 includes a resin portion 42, which is cylindrical and has a closed end, and an aluminum (metal) shield 43, which is formed from a thin plate. The cover 41 is molded from resin using the shield 43 as the core. The shield 43 is located inside the resin portion 42.

The resin portion 42 includes an outer tubular portion 42a and an outer lid 42b. The outer tubular portion 42a is annular and extends in the axial direction of the rotation shaft 19. The outer lid 42b is continuous with the outer tubular portion 42a and extends perpendicular to the outer tubular portion 42a.

The shield 43 includes a tubular portion 43a and a lid 43b. The tubular portion 43a is annular and extends in the axial direction of the rotation shaft 19. The lid 43b is continuous with the tubular portion 43a and extends perpendicular to the tubular portion 43a. The tubular portion 43a extends along the inner circumferential surface of the outer tubular portion 42a of the resin portion 42. The lid 43b extends along the inner end surface of the lid 42b of the resin portion 42.

As shown in FIG. 1B, the resin portion 42 includes an outer coupler 42f that projects radially outward from the outer tubular portion 42a. In addition, the shield 43 has a coupler 43f extending along the inner end surface of the outer coupler 42f. Thus, the outer coupler 42f is located outside the coupler 43f and covers the outer side of the coupler 43f. The inner surface of the coupler 43f that faces toward the suction housing member 12 is in contact with the flange 12f of the suction housing member 12. The shield 43 extends over the entire inner surface of the resin portion 42 and blocks electromagnetic noise transmitted from the resin portion 42.

The cover 41 includes an insertion hole 41h into which a bolt 50 is insertable. The bolt 50 couples the cover 41 to the suction housing member 12. The insertion hole 41h includes a first insertion hole 43h, which is formed in the coupler 43f, and a second insertion hole 42h, which is formed in the outer coupler 42f. The second insertion hole 42h has a larger diameter than the first insertion hole 43h. The first insertion hole 43h is aligned with the second insertion hole 42h. The bolt 50 includes a threaded shaft 50a and a head 50b, which is located at one end of the shaft 50a. Further, a tube 51 is arranged in the second insertion hole 42h. The bolt 50 is inserted into the tube 51. The tube 51 functions as a spacer held between the bolt 50 and the coupler 43f. The tube 51 is made of aluminum (metal).

The tube 51 is integrally fixed to the outer coupler 42f by an adhesive applied between the outer circumferential surface of the tube 51 and the outer coupler 42f. This seals the gap between the tube 51 and the outer coupler 42f. The end surface of the tube 51 facing toward the head 50b is located outward from the outer surface of the outer coupler 42f.

An annular first sealing member 52 is arranged between the tube 51 and the head 50b of the bolt 50 in the axial direction of the shaft 50a of the bolt 50. The first sealing member 52, which is made of aluminum (metal), surrounds the shaft 50a and seals the gap between the tube 51 and the head 50b.

The end surface of the tube 51 that faces toward the suction housing member 12 is in contact with a portion of the coupler 43f surrounding the first insertion hole 43h. Thus, the wall of the first insertion hole 43h is located at the inner side of the wall of the second insertion hole 42h. In addition, the portion of the coupler 43f surrounding the first insertion hole 43h functions as a seat 43e held between the head 50b of the bolt 50 and the flange 12f of the suction housing member 12. The axial force of the bolt 50 is applied to the seat 43e through the tube 51 and not applied to the resin portion 42. Further, the flange 12f includes a threaded hole 12h with which the shaft 50a of the bolt 50 may be fastened.

The operation of the first embodiment will now be described.

The axial force of the bolt 50 is applied to the seat 43e through the tube 51 and not applied to the resin portion 42. The seat 43e and the tube 51 are held between the head 50b of the bolt 50 and the flange 12f of the suction housing member 12. Consequently, when the cover 41 is coupled to the suction housing member 12 by the bolt 50, the resin portion 42 is not held between the bolt 50 and the suction housing member 12. Thus, the axial force of the bolt 50 does not deform the resin portion 42. This avoids degradation of the seal between the suction housing member 12 and the cover 41 that would be caused when the resin portion 42 deforms and loosens the bolt 50.

The advantages of the present embodiment will now be described.

(1) The portion of the coupler 43f surrounding the first insertion hole 43h functions as the seat 43e held between the head 50b of the bolt 50 and the flange 12f of the suction housing member 12. The axial force of the bolt 50 is applied to the seat 43e through the tube 51 and not applied to the resin portion 42. Consequently, when the cover 41 is coupled to the suction housing member 12 by the bolt 50, the resin portion 42 is not held between the bolt 50 and the suction housing member 12. Thus, the axial force of the bolt 50 does not deform the resin portion 42. This avoids degradation of the seal between the suction housing member 12 and the cover 41 that would be caused when the resin portion 42 deforms and loosens the bolt 50.

(2) The second insertion hole 42h receives the tube 51 into which the bolt 50 is inserted. The tube 51 receives the axial force of the bolt 50 and is held between the bolt 50 and the seat 43e. The inner end surface of the tube 51 that faces toward the suction housing member 12 is in contact with the seat 43e. Thus, the axial force of the bolt 50 is applied to the seat 43e through the tube 51, and the outer coupler 42f does not receive the axial force of the bolt 50.

(3) The tube 51 is integrally fixed to the outer coupler 42f of the resin portion 42. This ensures the seal between the tube 51 and the outer coupler 42f.

(4) The first sealing member 52 is arranged between the tube 51 and the head 50b of the bolt 50 in the axial direction of the shaft 50a of the bolt 50. This ensures the seal between the tube 51 and the head 50b.

(5) The shield 43 extends over the entire inner surface of the resin portion 42. That is, the shield 43 is not located outside of the resin portion 42. This protects the shield 43 from corrosion.

(6) The outer end surface of the tube 51 that faces toward the head 50b is located outward from the outer surface of the outer coupler 42f of the resin portion 42. Thus, the tube 51 restricts contact between the head 50b of the bolt 50 and the outer surface of the outer coupler 42f. This avoids deformation of the resin portion 42 that would be caused by the axial force of the bolt 50.

Second Embodiment

Figure 2:
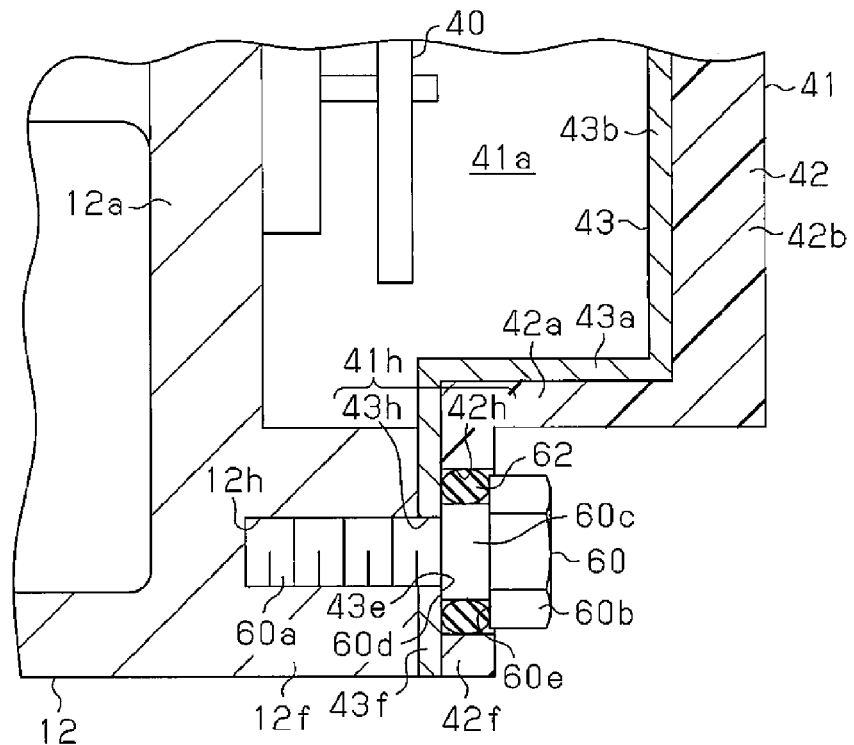
FIG. 2 is an enlarged cross-sectional view showing a bolt of a second embodiment.

Referring to FIG. 2, the second embodiment will now be described. Same reference numerals are given to those components that are the same as the corresponding components of the first embodiment. Such components will not be described in detail.

As shown in FIG. 2, a bolt 60 includes a threaded shaft 60a, which is arranged in the first insertion hole 43h, a large diameter portion 60c, which is arranged in the second insertion hole 42h and has a larger diameter than the shaft 60a, and a head 60b. The head 60b and the shaft 60a are located at opposite sides of the large diameter portion 60c. A first step 60d is formed between the shaft 60a and the large diameter portion 60c, and a second step 60e is formed between the large diameter portion 60c and the head 60b. The first step 60d is in contact with the seat 43e. The second step 60e is located in the second insertion hole 42h.

An annular second sealing member 62 is arranged in the second insertion hole 42h. The second sealing member 62 is arranged between the large diameter portion 60c and the outer coupler 42f and surrounds the large diameter portion 60c. The second sealing member 62, which is made of rubber, is in contact with the second step 60e and seals the gap between the large diameter portion 60c and the outer coupler 42f. As the bolt 60 fastens the cover 41 to the suction housing member 12, the second sealing member 62 is pressed by the second step 60e toward the suction housing member 12 and elastically deformed. In addition, the second sealing member 62 is held between the second step 60e and the coupler 43f in the axial direction of the shaft 60a of the bolt 60. This further improves the seal between the large diameter portion 60c and the outer coupler 42f.

The operation of the second embodiment will now be described.

The axial force of the bolt 60 is applied to the seat 43e through the first step 60d and not applied to the resin portion 42. The seat 43e and the large diameter portion 60c are held between the head 60b of the bolt 60 and the flange 12f of the suction housing member 12. When the cover 41 is coupled to the suction housing member 12 by the bolt 60, the resin portion 42 is not held between the bolt 60 and the suction housing member 12. Thus, the axial force of the bolt 50 does not deform the resin portion 42. This avoids degradation of the seal between the suction housing member 12 and the cover 41 that would be caused when the resin portion 42 deforms and loosens the bolt 60.

Accordingly, the second embodiment has the following advantages in addition to advantages (1) and (5) of the first embodiment.

(7) The bolt 60 includes the shaft 60a, which is arranged in the first insertion hole 43h, the large diameter portion 60c, which is arranged in the second insertion hole 42h and has a larger diameter than the shaft 60a, and the head 60b. The head 60b and the shaft 60a are located at opposite sides of the large diameter portion 60c. The first step 60d is formed between the shaft 60a and the large diameter portion 60c, and the second step 60e is formed between the large diameter portion 60c and the head 60b. The first step 60d is in contact with the seat 43e. Thus, the axial force of the bolt 60 is applied to the seat 43e by the first step 60d. This eliminates the need for the spacer of the first embodiment. Thus, the second embodiment uses fewer components.

(8) The second sealing member 62 is arranged between the large diameter portion 60c and the outer coupler 42f and surrounds the large diameter portion 60c. This ensures the seal between the large diameter portion 60c and the outer coupler 42f.

(9) The second sealing member 62 is pressed by the second step 60e toward the suction housing member 12 and elastically deformed. This further improves the seal between the large diameter portion 60c and the outer coupler 42f.

(10) The second sealing member 62 is held between the second step 60e and the coupler 43f in the axial direction of the bolt 60. If the second sealing member 62 were held between the second step 60e and the resin portion 42, for example, the resin portion 42 would receive the axial force of the bolt 60 through the second sealing member 62 and be deformed.

It should be apparent to those skilled in the art that the present invention may be embodied in many other specific forms without departing from the spirit or scope of the invention. Particularly, it should be understood that the present invention may be embodied in the following forms.

Figure 3:
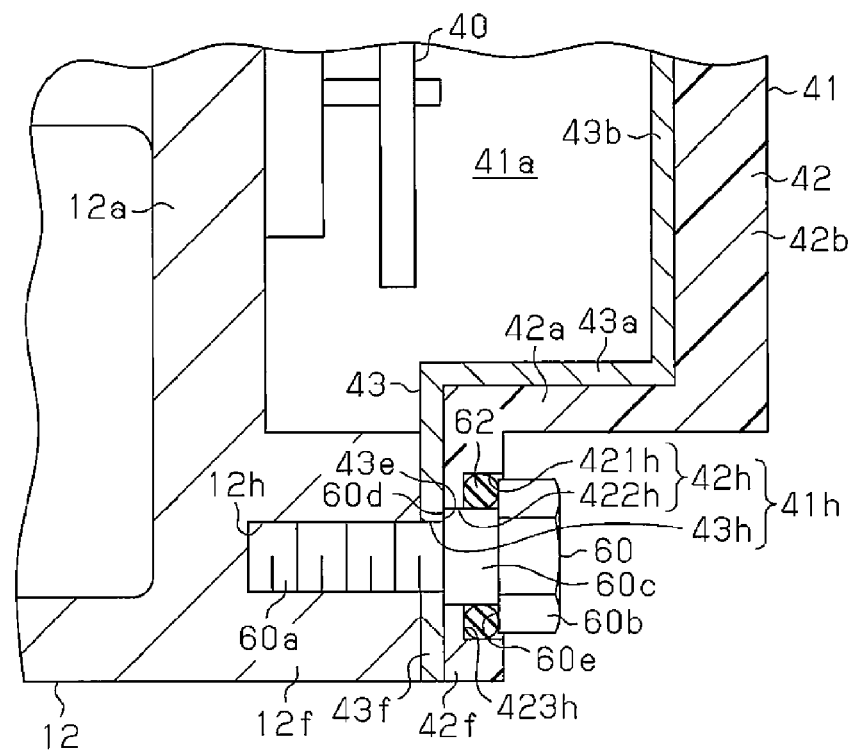
FIG. 3 is an enlarged cross-sectional view showing a bolt of another embodiment.

As shown in FIG. 3, the second insertion hole 42h may include a large portion 421h and a small portion 422h. The small portion 422h has a smaller diameter than the large portion 421h and is closer to the shield 43 than the large portion 421h. A step 423h is formed between the large portion 421h and the small portion 422h. The second sealing member 62 may be arranged in the large portion 421h between the large diameter portion 60c and the outer coupler 42f. In addition, the second sealing member 62 may be held between the second step 60e and the step 423h in the axial direction of the shaft 60a of the bolt 60. This facilitates deformation of the second sealing member 62 in the second insertion hole 42h and further improves the seal between the large diameter portion 60c and the outer coupler 42f.

As shown in FIG. 4, an annular sealing member 51s may be arranged on the outer circumferential surface of the tube 51. The sealing member 51s seals the gap between the outer circumferential surface of the tube 51 and the outer coupler 42f.

As shown in FIG. 5, the resin portion 42 does not have to include the outer coupler 42f. The cover 41 may be coupled to the suction housing member 12 by inserting the bolt 50 into the first insertion hole 43h and engaging the shaft 50a with the threaded hole 12h. The axial force of the bolt 50 is applied to the seat 43e and not applied to the resin portion 42, and the seat 43e is held between the head 50b of the bolt 50 and the flange 12f of the suction housing member 12. Thus, when the cover 41 is coupled to the suction housing member 12 by the bolt 50, the resin portion 42 is not held between the bolt 50 and the suction housing member 12. Thus, the axial force of the bolt 50 does not deform the resin portion 42. In this structure, it is preferable that a sealing member 70 be arranged between the head 50b and the coupler 43f.

The cover 41 may include a further resin portion at the inner side of the shield 43.

In the first embodiment, the outer end surface of the tube 51 may be flush with the outer surface of the outer coupler 42f. Further, the outer end surface of the tube 51 facing toward the head 50b may be closer to the suction housing member 12 than the outer surface of the outer coupler 42f. In this case, the head 50b of the bolt 50 is required to not be in contact with the outer surface of the outer coupler 42f and be located in the second insertion hole 42h, for example.

The shield 43 may be made of a conductive material such as iron or copper.

The compression unit 15, the electric motor 16, and the motor driving circuit 40 do not have to be arranged in this order in the axial direction of the rotation shaft 19. For example, the cover 41 may be fixed to the circumferential wall of the suction housing member 12, and the motor driving circuit 40 may be accommodated in an accommodating chamber defined by the circumferential wall of the suction housing member 12 and the cover 41.

The compression unit 15 may be of a piston type or a vane type.

The technical ideas obtainable from the above embodiments and the modified examples are described below.

The motor-driven compressor according to any one of claims 1 to 10, wherein the electric motor includes a rotor, the housing accommodates a rotation shaft that rotates integrally with the rotor, and the compression unit, the electric motor, and the motor driving circuit are arranged in this order in an axial direction of the rotation shaft.

The present examples and embodiments are to be considered as illustrative and not restrictive and the invention is not to be limited to the details given herein, but may be modified within the scope and equivalence of the appended claims.

The invention claimed is:

1. A motor-driven compressor comprising:
a metal housing accommodating a compression unit and an electric motor; a cover coupled to the housing, wherein the cover includes a resin portion and a metal shield, and the shield blocks electromagnetic noise; and
a bolt that couples the cover to the housing, wherein
the housing and the cover define an accommodating chamber that accommodates a motor driving circuit that drives the electric motor,
the cover includes an insertion hole into which the bolt is insertable,
the shield includes a seat that surrounds the insertion hole and is held between the bolt and the housing without the resin portion being held therebetween so that an axial force of the bolt is applied to the seat and not to the resin portion.

2. The motor-driven compressor according to claim 1 wherein,
the insertion hole includes a first insertion hole, which is formed in the shield, and a second insertion hole, which is formed in the resin portion,
the second insertion hole has a larger diameter than the first insertion hole,
the motor-driven compressor further comprises a spacer arranged in the second insertion hole,
the bolt is inserted into the spacer,
the spacer receives the axial force of the bolt and is held between the bolt and the seat, and
the spacer includes an end surface that contacts the seat.

3. The motor-driven compressor according to claim 2, wherein the spacer is integrally fixed to the resin portion.

4. The motor-driven compressor according to claim 2, further comprising an annular first sealing member, wherein
the bolt includes a shaft and a head,
the first sealing member surrounds the shaft and is held between the spacer and the head of the bolt in an axial direction of the bolt.

5. The motor-driven compressor according to claim 1, wherein
the insertion hole includes a first insertion hole, which is formed in the shield, and a second insertion hole, which is formed in the resin portion,
the bolt includes a shaft, which is inserted into the first insertion hole, a large diameter portion, which is arranged in the second insertion hole and has a larger outer diameter than the shaft, and a head,
the shaft and the head are located at opposite sides of the large diameter portion, the bolt includes a first step, which is located between the shaft and the large diameter portion, and a second step, which is located between the large diameter portion and the head, and
the first step is in contact with the seat.

6. The motor-driven compressor according to claim 1, wherein the shield is inside the resin portion.

7. A motor-driven compressor comprising:
a metal housing accommodating a compression unit and an electric motor;
a cover coupled to the housing, wherein the cover includes a resin portion and a metal shield, and the shield blocks electromagnetic noise;
a bolt that couples the cover to the housing, wherein
the housing and the cover define an accommodating chamber that accommodates a motor driving circuit that drives the electric motor,
the cover includes an insertion hole into which the bolt is insertable,
the shield includes a seat that surrounds the insertion hole and is held between the bolt and the housing,
the cover is configured to allow for an axial force of the bolt to be applied to the seat and not to the resin portion,
the insertion hole includes a first insertion hole, which is formed in the shield, and a second insertion hole, which is formed in the resin portion,
the bolt includes a shaft, which is inserted into the first insertion hole, a large diameter portion, which is arranged in the second insertion hole and has a larger outer diameter than the shaft, and a head,
the shaft and the head are located at opposite sides of the large diameter portion,
the bolt includes a first step, which is located between the shaft and the large diameter portion, and a second step, which is located between the large diameter portion and the head, and
the first step is in contact with the seat; and
an annular second sealing member arranged in the second insertion hole around the large diameter portion.

8. The motor-driven compressor according to claim 7, wherein the second sealing member is pressed by the second step toward the housing and elastically deformed.

9. The motor-driven compressor according to claim 8, wherein the second sealing member is held between the second step and the shield in an axial direction of the bolt.

10. The motor-driven compressor according to claim 8, wherein the second sealing member is held between the second step and the resin portion in the axial direction of the bolt.

11. A motor-driven compressor comprising:
a metal housing accommodating a compression unit and an electric motor;
a cover coupled to the housing, wherein the cover includes a resin portion and a metal shield, and the shield blocks electromagnetic noise; and
a bolt that couples the cover to the housing, wherein
the housing and the cover define an accommodating chamber that accommodates a motor driving circuit that drives the electric motor,
the cover includes an insertion hole into which the bolt is insertable,
the shield includes a seat that surrounds the insertion hole and is held between the bolt and the housing,
the cover is configured to allow for an axial force of the bolt to be applied to the seat and not to the resin portion, and
a surface of the seat is in direct contact with the housing.

* * * * *